(12) United States Patent
Pattan et al.

(10) Patent No.: US 8,650,070 B2
(45) Date of Patent: Feb. 11, 2014

(54) SYSTEM AND METHOD FOR SHARING CONTENT ON THIRD-PARTY MOBILE APPLICATIONS

(75) Inventors: Neha Pattan, Mountain View, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/196,591

(22) Filed: Aug. 2, 2011

(65) Prior Publication Data

US 2013/0036016 A1 Feb. 7, 2013

(51) Int. Cl.
*G06Q 30/00* (2012.01)

(52) U.S. Cl.
USPC ............................................................ 705/14

(58) Field of Classification Search
USPC ............................................................ 705/14
See application file for complete search history.

(56) References Cited

U.S. PATENT DOCUMENTS

| | | |
|---|---|---|
| 2003/0047602 A1 | 3/2003 | Iida et al. |
| 2009/0164929 A1 | 6/2009 | Chen et al. |
| 2009/0222348 A1* | 9/2009 | Ransom et al. ................. 705/14 |
| 2010/0217670 A1 | 8/2010 | Reis et al. |
| 2010/0332330 A1 | 12/2010 | Goel et al. |
| 2011/0010234 A1 | 1/2011 | Lindelsee et al. |
| 2011/0264736 A1* | 10/2011 | Zuckerberg et al. ........... 709/204 |
| 2012/0233701 A1* | 9/2012 | Kidron ............................ 726/26 |

OTHER PUBLICATIONS

Richardson, Kailei, Best Practices: Using FAcebook Effectively in Your Marketing Mix (part 2), Mar. 31, 2011, Point Roll, pp. 1-2.*
Cain, Jerry, New Like Button Features Mean More Opportunities for Liking, Sep. 9, 2010.*
Richardson, Kailei, Best Practices: Using Facebook Effectively in Your Marketing Mix (part 2), Mar. 31, 2011, PointRoll, pp. 1-2.

* cited by examiner

*Primary Examiner* — Alvin L Brown
(74) *Attorney, Agent, or Firm* — Birch, Stewart, Kolasch & Birch, LLP

(57) ABSTRACT

Methods and systems are provided for allowing users to recommend advertisements displayed in a third-party application running on a user device while not granting the third-party application privileges to send such recommendations on behalf of the user. A social network application installed on the user device, and separate from the third-party application, acts as a proxy for advertisement recommendation requests (e.g., indications that a user wishes to recommend an advertisement displayed), and a user is required to confirm all such recommendation actions. In this manner, a third-party application (e.g., a "malicious third-party application) cannot send advertisement recommendation requests, and/or requests to undo such recommendations, on its own as if it were the user.

20 Claims, 9 Drawing Sheets

SYSTEM AND METHOD FOR SHARING CONTENT ON THIRD-PARTY MOBILE APPLICATIONS

FIELD OF THE INVENTION

The present disclosure generally relates to systems and methods for providing advertising to users. More specifically, aspects of the present disclosure relate to providing users with social interaction tools without allowing third-party applications to utilize such tools on behalf of users.

BACKGROUND

Advertisers wish to use all available resources in providing the most effective advertising to users. In particular, advertisers want advertisements displayed to a user to somehow be targeted or personalized for that user so as to capture the user's interest. To further enhance the appeal of advertisements to a user, content associated with a social network of the user may be incorporated or otherwise presented with the advertisements. Interactive advertising allows a user to perform various actions when presented with an advertisement. For example, a user may wish to indicate that he or she likes a particular advertisement or recommends the advertisement to his or her family and friends.

Such indications are helpful to other users who are associated with the user through a social network since these other users may be more incentivized to explore an advertisement when they see that it has received positive feedback or been recommended. However, when interactive advertisements such as these are presented to users in a third-party application, it is important to provide mechanisms that prevent the third-party applications from initiation actions on behalf of the users. Without implementing effective safeguards, malicious third-party applications may generate user indications that appear to be genuine, but are actually not tied to any actions taken by the user.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for providing a social network user recommendation control and personalized social network annotations in conjunction with promotional content presented to a user on a user device, the method comprising: receiving a request for promotional content to be displayed in a third-party application on a user device; determining that a social network application is installed on the user device, the social network application being separate from the third-party application and containing information about the social network of the user; using the social network application to determine that the user accepts annotations being presented with promotional content when the promotional content is displayed on the user device, the annotations being associated with the social network of the user and including information about one or more other users in the social network; selecting a promotional content item to be displayed in the third-party application; determining, based on the selected promotional content item and the information about the social network of the user contained in the social network application, an annotation to be presented with the promotional content item; and providing the selected promotional content item, the annotation, and a user recommendation control associated with the social network for display in the third-party application.

In another embodiment of the disclosure, the method for providing a social network user recommendation control and personalized social network annotations further includes receiving an indication that the user recommended the promotional content item displayed in the third-party application, the indication being based on a detected interaction with the user recommendation control displayed with the promotional content item.

In another embodiment of the disclosure, the method for providing a social network user recommendation control and personalized social network annotations further includes, in response to receiving the indication that the user recommended the promotional content item, presenting the user with a recommendation confirmation request, the recommendation confirmation request being a request for the user to confirm that the user recommended the promotional content item.

In yet another embodiment of the disclosure, the method for providing a social network user recommendation control and personalized social network annotations further includes determining whether the received indication is for a first recommendation of promotional content made by the user; and responsive to determining that the received indication is for a first recommendation of promotional content made by the user, presenting the user with a request for permission to collect information about the user.

In still another embodiment of the disclosure, the method for providing a social network user recommendation control and personalized social network annotations further includes, in response to receiving the requested permission from the user, presenting the user with a recommendation confirmation request, the recommendation confirmation request being a request for the user to confirm that the user recommended the promotional content item.

Another embodiment of the present disclosure relates to a system comprising at least one processor, and a computer-readable medium coupled to the at least one processor having instructions stored thereon which, when executed by the at least one processor, causes the at least one processor to: receive a request for promotional content to be displayed in a third-party application on a user device; determine that a social network application is installed on the user device, the social network application being separate from the third-party application and containing information about the social network of the user; use the social network application to determine that the user accepts annotations being presented with promotional content when the promotional content is displayed on the user device, the annotations being associated with the social network of the user and including information about one or more other users in the social network; select a promotional content item to be displayed in the third-party application; determine, based on the selected promotional content item and the information about the social network of the user contained in the social network application, an annotation to be presented with the promotional content item; and provide the selected promotional content item, the annotation, and a user recommendation control associated with the social network for display in the third-party application.

In another embodiment of the disclosure, the at least one processor of the system is further caused to receive an indication that the user recommended the promotional content item displayed in the third-party application, the indication being based on a detected interaction with the user recommendation control displayed with the promotional content item.

In another embodiment of the disclosure, the at least one processor of the system is further caused to, in response to receiving the indication that the user recommended the promotional content item, present the user with a recommendation confirmation request, the recommendation confirmation request being a request for the user to confirm that the user recommended the promotional content item.

In another embodiment of the disclosure, the at least one processor of the system is further caused to determine whether the received indication is for a first recommendation of promotional content made by the user; and in response to determining that the received indication is for a first recommendation of promotional content made by the user, present the user with a request for permission to collect information about the user.

In another embodiment of the disclosure, the at least one processor of the system is further caused to, in response to receiving the requested permission from the user, present the user with a recommendation confirmation request, the recommendation confirmation request being a request for the user to confirm that the user recommended the promotional content item.

In other embodiments of the disclosure, the methods and systems described herein may optionally include one or more of the following additional features: presenting the user with the recommendation confirmation request includes displaying the selected promotional content item, an identifier of the third-party application, and at least one user-selectable action; the at least one user-selectable action includes at least one of confirming the recommendation of the promotional content item and canceling the recommendation of the promotional content item; the information about the one or more other users in the social network included in annotations presented with promotional content includes one or both of a quantity of other users in the social network who recommend the promotional content and identifiers of other users in the social network who recommend the promotional content; the annotation provided for display with the promotional content item in the third-party application includes a quantity of other users in the social network who recommend the promotional content item; and/or the annotation provided for display with the promotional content item in the third-party application includes an identifier of at least one other user in the social network who recommends the promotional content item.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
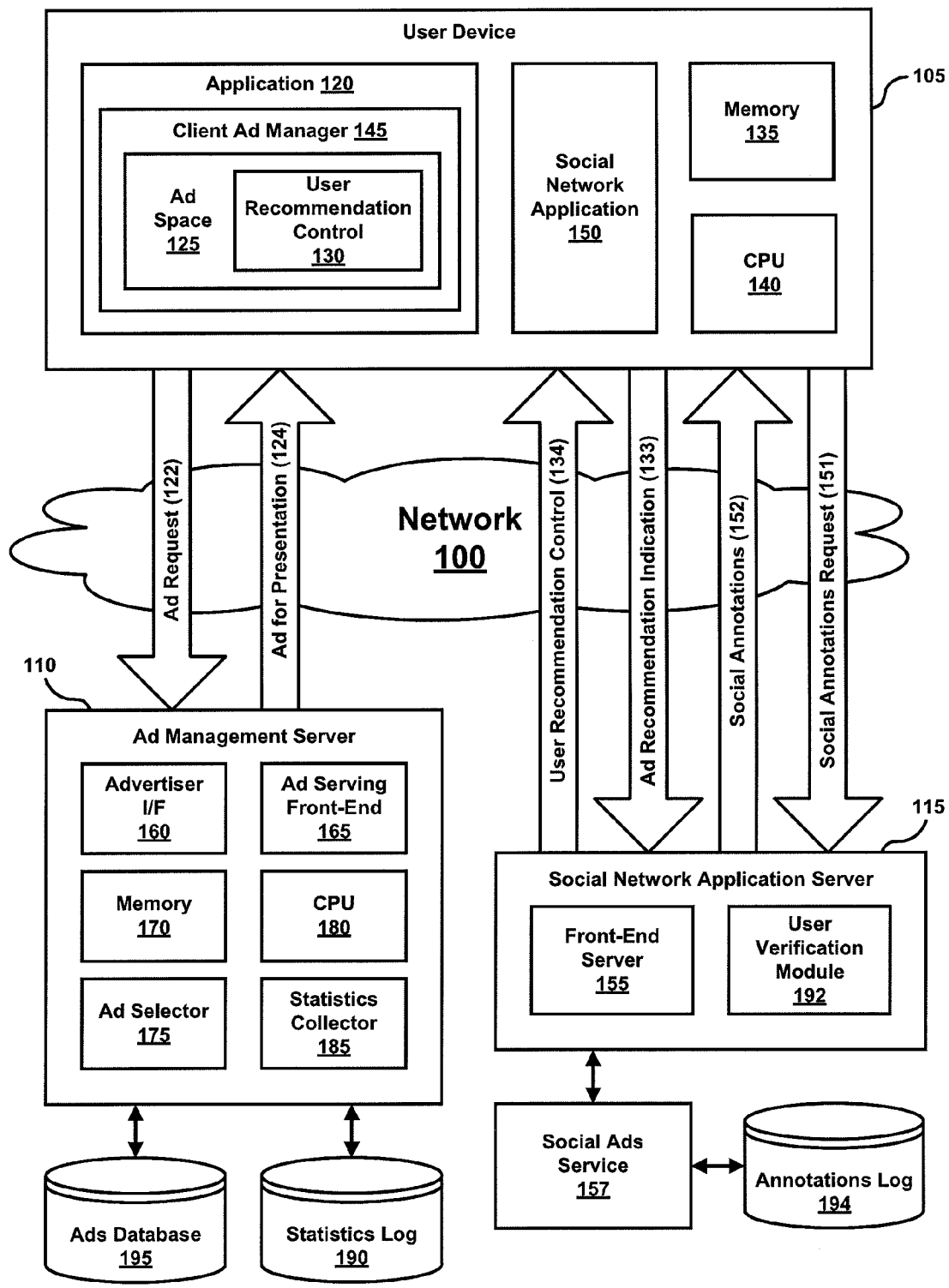
FIG. 1 is a block diagram illustrating an example advertisement presentation system in which various embodiments of the present disclosure may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to methods and systems for providing a user recommendation control and personalized social annotations in conjunction with content that is presented to a user in a third-party application. The content can be an advertisement (sometimes referred to simply as an "ad"), and the third-party application can be a third-party mobile application (e.g., third-party software running on a mobile user device that can perform certain functions or tasks for the user). As will be described in greater detail herein, a user recommendation control (e.g., widget, tool, point, button, etc.) may be provided for display to a user along with an ad in such third-party applications such that the user may interact with the recommendation control to indicate, for example, that the user recommends, likes, or approves the ad.

Furthermore, one or more embodiments described herein relate to a method and system for allowing a user to recommend ads displayed in a third-party application running on a user device while not granting the third-party application privileges to send such recommendations on behalf of the user. As will be described in greater detail below, aspects of the present disclosure relate to proxying ad recommendation requests (e.g., indications that a user wishes to recommend an ad displayed) through a social network application installed on the user's device and requiring the user to confirm all such actions. In this manner, a third-party application (e.g., a "malicious" third-party application) cannot send ad recommendation requests, and/or requests to undo ad recommendations, on its own as if it were the user making such requests.

When a user makes a request for on-line content, such as a web page, a video/audio clip, a game, or other online resource, one or more content requests can be initiated to retrieve the requested content from content publishers for presentation to the user on a user device. Examples of content publishers include publishers of web sites, search engines that publish search results in response to a query, and numerous other sources or parties that make information and/or experiences available for presentation to a user. In some arrangements, one or more additional items of content, such as advertisements, may be provided along with the requested content. As such, when content is requested by a user in a third-party application, one or more ad requests may also be initiated to request ads for presentation with the requested content in the third-party application. In accordance with various embodiments of the present disclosure that will be described in greater detail herein, some ads provided for presentation in a third-party application can include a social component or social context. This social component or context may be associated with a social network to which the user belongs, and where the social network is separate from (e.g., not associated or affiliated with) the third-party application in which an ad is to be provided for presentation.

An advertisement is an entity (e.g., video, audio file, image, text, etc.) that presents a piece of information to a user and is designed to be used in whole or in part by the user. Ads can be provided (e.g., presented) to a user in electronic form, such as banner ads on a web page, as ads presented in a user interface associated with an application (e.g., a third-party application running on a user device), as ads presented with search results, as ads presented with emails, and the like. Such electronic ads may also contain links to other electronic content including web pages, images, audio files video files, etc. Advertisements may also be referred to as "promotional content" or one or more other similar such terms.

In at least some embodiments, the user recommendation control provided for presentation to a user along with an ad in a third-party application can be overlaid on the ad creative that is displayed. Depending on the implementation, the user recommendation control can show social annotations that provide information about the specific ad being displayed. For example, the social annotations can include a number of users (who may or may not be in some relation to the user through a common social network) who like the ad or who have interacted with the ad, a number of users in a certain geographic location or region who have re-published the ad, the names of one or more of the user's friends who like the ad, and so on. Additionally, the user recommendation control can be configured as a button or point that the user can interact with to make an indication or designation (e.g., that the user likes or recommends that ad) for other users to see when presented with the ad, to post a comment on the ad, and, in some arrangements, initiate a process of following an advertiser (e.g., an advertiser's profile) associated with the ad in a social network.

It should be noted that the user recommendation control described herein may be referred to in numerous other ways in addition to or instead of "user recommendation control", without departing from its intended meaning and without limiting any of its features and/or functionalities. For example, the user recommendation control may also be referred to as a "user interaction tool", "user recommendation widget", user interaction point", "user recommendation button", "user interaction control" as well as other identifiers, names and labels similar in nature to those mentioned. Irrespective of the term or phrase used to refer to the user recommendation control, in the various embodiments described herein the user recommendation control allows a user to, among other things, indicate that the user recommends, likes, or approves an advertisement presented to the user (e.g., on a display of a user device) in a third-party application.

It should also be noted that while the examples provided in this disclosure focus primarily on social overlays (e.g., annotations and interaction controls) used with advertisements presented in third-party applications, such social overlays can also be used in other contexts and with other types of content, including websites, search results, or other resources provided by a content provider.

FIG. 1 shows an example advertisement presentation system and surrounding environment in which various embodiments described herein may be implemented. The example system and environment shown includes a user device 105, an ad management server 110, and a social network application server 115. The example environment also includes a network 100, such as a local area network (LAN), a wide area network (WAN), the Internet, or a combination thereof. The network 100 connects the user device 105, the ad management server 110, the social network application server 115, and can also connect additional devices and servers of the same or different type (not shown).

The user device 105 can be any of a number of different electronic devices under control of a user and capable of requesting and receiving resources. As used herein, a resource is any data that can be provided over the network 100, and can be identified by a resource address associated with the resource. Examples of resources include images, video, HTML pages, content (e.g., words, phrases, images, etc.), embedded information such as meta-information and hyperlinks, and also embedded instructions, such as JavaScript scripts. Examples of the user device 105 can be one or more personal computers, telephones, personal digital assistants (PDAs), television systems, etc., that are capable of sending and receiving data over the network 100. The user device 105 can also be a portable user device, such as a laptop computer, tablet computer, mobile communication device (e.g., cell phone, smartphone), and the like, capable of also sending and receiving data over the network 100.

The user device 105 may include one or more applications 120, which may be third-party applications separate from (e.g., not associated or affiliated with) the social network application 150, the ad management server 110, and the social network application server 115. The application 120 can consist of software that runs on the user device 105 and performs certain functions or tasks for a user, such as providing user interfaces for messaging services or providing services related to games, videos, or music. The application 120 may also be a mobile application consisting of software designed to run on a mobile user device, such as a cell phone or smartphone. Some example types of applications that the application 120 may be include multimedia (e.g., video or audio players, graphic or image viewers, etc.), communication (e.g., news or information clients, messaging or e-mail clients, etc.), games, productivity (e.g., calculators, calendars, task managers, etc.), as well as numerous other categories and types. In at least one embodiment, the application 120 may include a client ad manager 145 and designated ad space 125 for the display of ads related to the application 120 and/or the content or information presented or processed therein.

The user device 105 may also include one or more web browser tools (not shown) for viewing and interacting with webpages via a wired or wireless internet connection and/or via a mobile data exchange connection such as cellular, optical, near field communication, or some combination thereof. Various web browser tools may similarly include a designated ad space for the display of advertisements related to webpage content, search results, web-based e-mail, and the like. As shown, the user device 105 may include a computer processing unit (CPU) 140, a memory 135, and a social network application 150. Details regarding the social network application 150 will be provided below.

Advertisers may directly or indirectly submit, log, maintain, and utilize information in the ad management server 110. For example, advertisers may access and/or interact with the ad management server 110 via an advertiser interface (I/F) 160. Additionally, depending on the implementation, advertisers may be able to access and/or interact with the ad management server 110 in one or more other ways. In at least some embodiments, advertisers provide ads to the ad management server 110 via the advertiser interface 160, and the ad management server 110, in turn, presents the ads for presentation 124 to the user device 105 using various methods described in greater detail below. These ads may be presented to the user device in response to an ad request 122 received at the ad management server 110, and may be in the form of graphical ads, such as banner ads, audio ads, video ads, still image ads, text-only ads, as well as ads combining one or more of any such forms. The ads may also include embedded information or data, including links to one or more web pages, meta-information, and/or machine-executable instructions.

In various embodiments described herein, ads may be provided for presentation 124 in the application 120 of the user device 105 in conjunction with a user recommendation control 134 and one or more social annotations 152. For example, the social network application server 115 may provide, for display along with (e.g., as an overlay on) an ad provided by the ad management server 110, a user recommendation control 134 generated by a social ads service 157. The social network application server 115 may be a web-application server, which is a front-end that hosts the social network application 150 and the user recommendation control 134. The social network application server 115 may be configured to exchange authentication credentials (e.g., ad share tokens) and user information with the social ads service 157 such that the social ads service 157 retrieves social annotations 152 and other related information from an annotations log 194 for use in rendering the user recommendation control.

Figure 2:
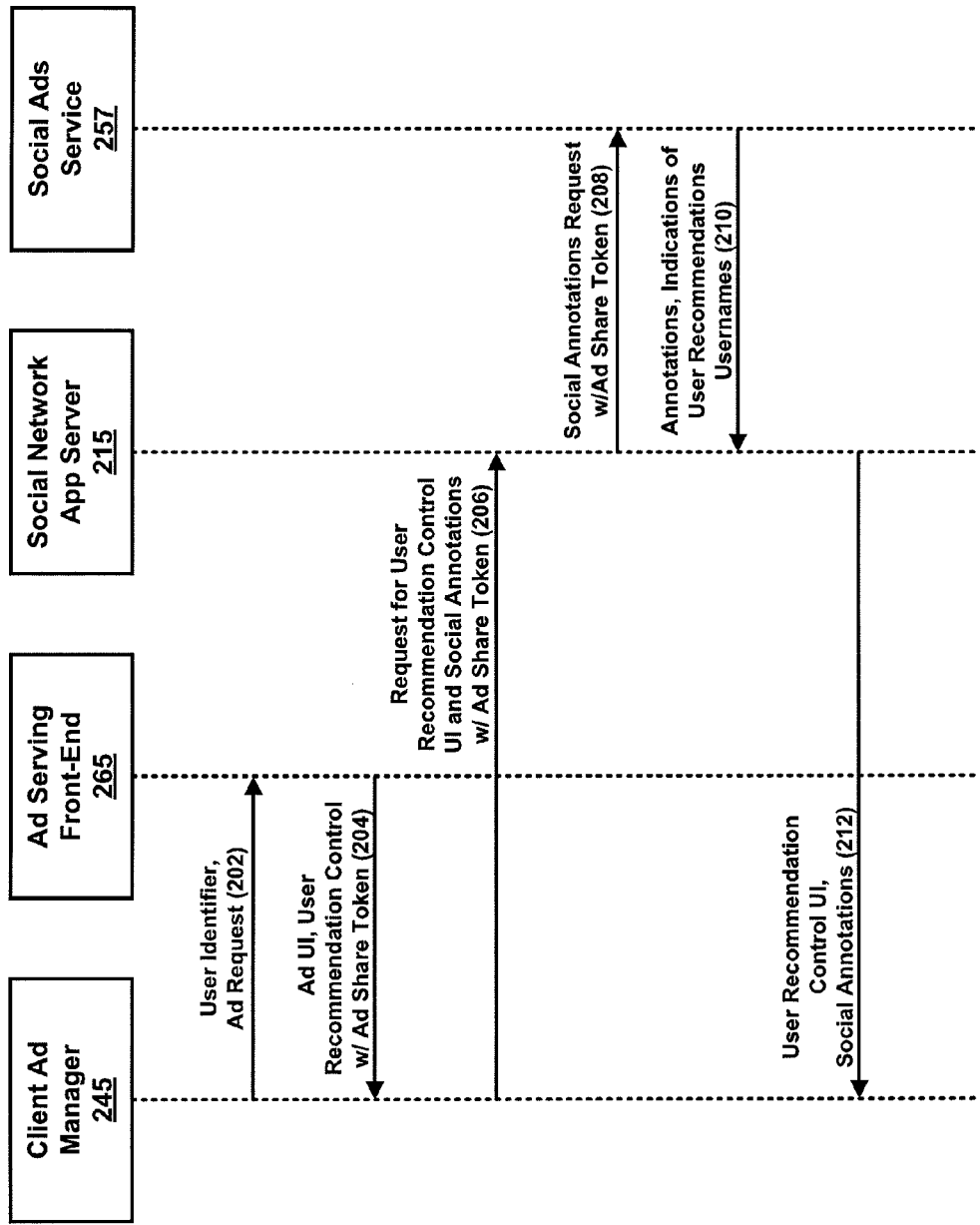
FIG. 2 is a data flow diagram illustrating example communications for providing a user recommendation control and personalized social annotations in conjunction with an advertisement in a third-party application according to one or more embodiments described herein.

FIG. 2 is a data flow diagram illustrating example communications for providing a user recommendation control and personalized social annotations in conjunction with an advertisement in a third-party application according to one or more embodiments described herein. Client ad manager 245 sends an ad request and a user identifier 202 to ad serving front-end 265. In at least one arrangement, the ad request 202 may be sent from the client ad manager 245, for example, using hypertext transfer protocol (HTTP). Depending on the implementation, the user identifier sent with the ad request is encrypted. Therefore, the ad serving front-end 265 may be configured to decrypt the user identifier to make a determination as to whether the user has "opted-out" (e.g., elected not to receive) of social ads. For example, a user who does not wish to share his or her information, as well as information related to the user's friends within a social network of the user, may opt-out of receiving ads with social annotations included.

Figure 5:
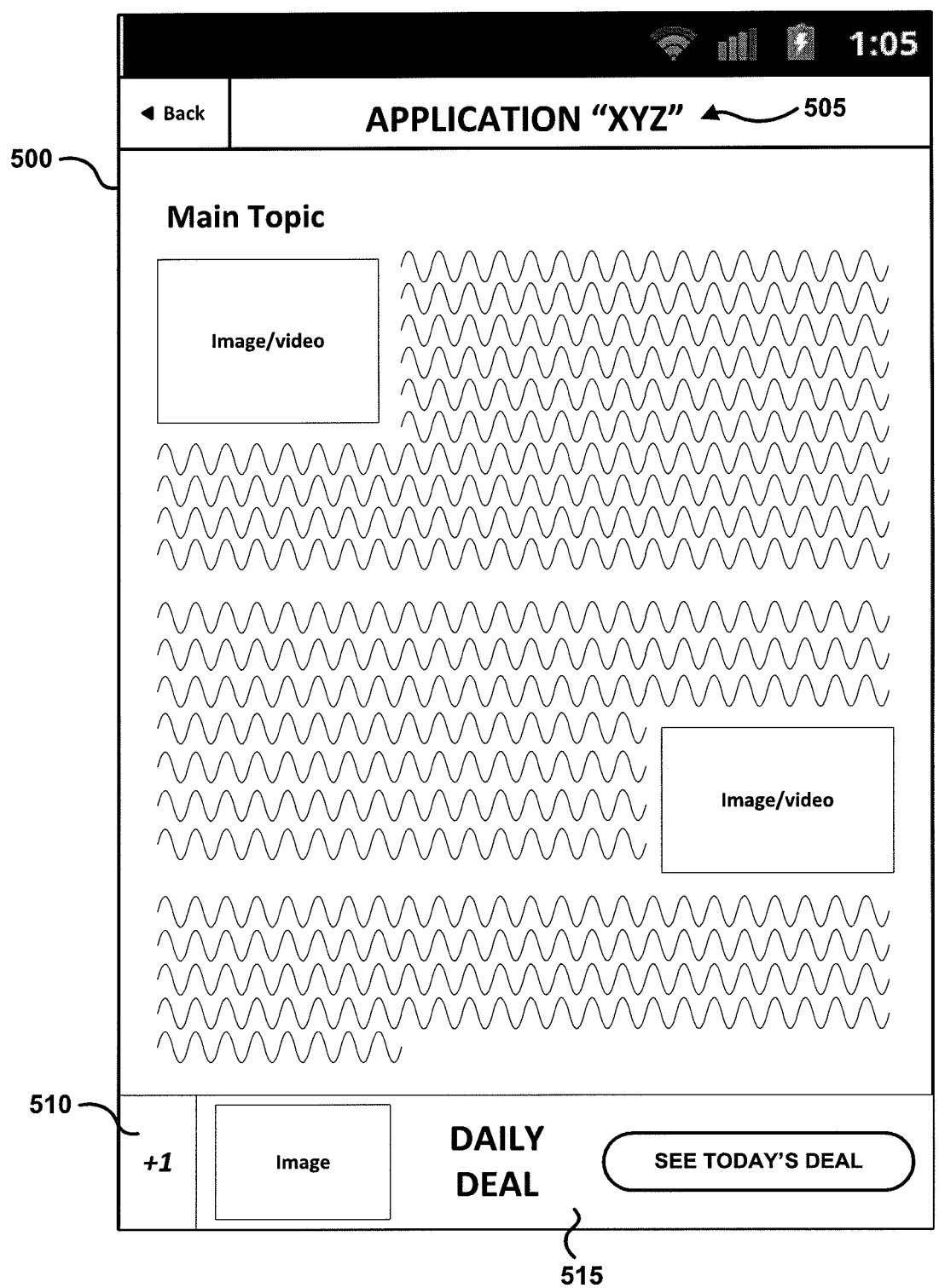
FIG. 5 is an example user interface that includes an advertisement with a user recommendation control in a third-party application according to one or more embodiments described herein.
Figure 6:
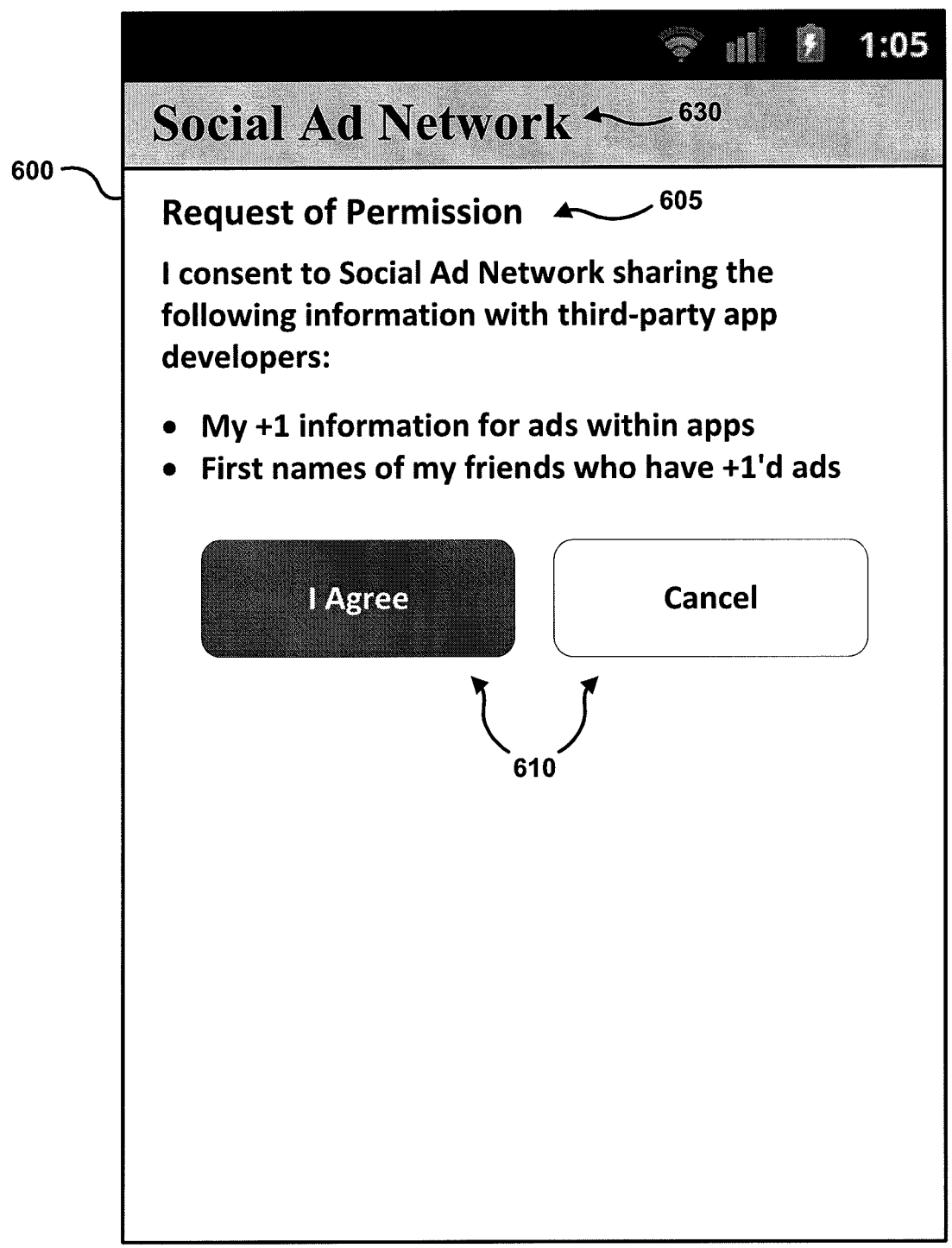
FIG. 6 is an example user interface that includes a request for a user to consent to the sharing of recommendations of advertisements made by the user according to one or more embodiments described herein.

Regardless of whether the particular user has opted-out of social ads, tin at least some embodiments described herein, the ad serving front-end 265 sends back to the client ad manager 245 an ad user interface that includes (e.g., as an overlay on the ad displayed) a user recommendation control 204, along with an ad share token. In some embodiments, the ad user interface received by the client ad manager 245 may look similar to the example user interface shown in FIG. 5. With reference to FIG. 5, an ad user interface 515 may be provided for display in a third-party application interface 500. The ad user interface 515 can include a user recommendation control 510, which in the example shown is represented by a "+1" symbol.

The client ad manager 245 sends a request for a user recommendation control user interface and social annotations 206 to a social network application server 215, which in at least some arrangements is a web application server configured as a front-end to host a social network application (e.g., social network application 150 shown in FIG. 1) installed on the user device. The request 206 sent from the client ad manager 245 also includes the ad share token received from the ad serving front-end in data flow 204.

Figure 7:
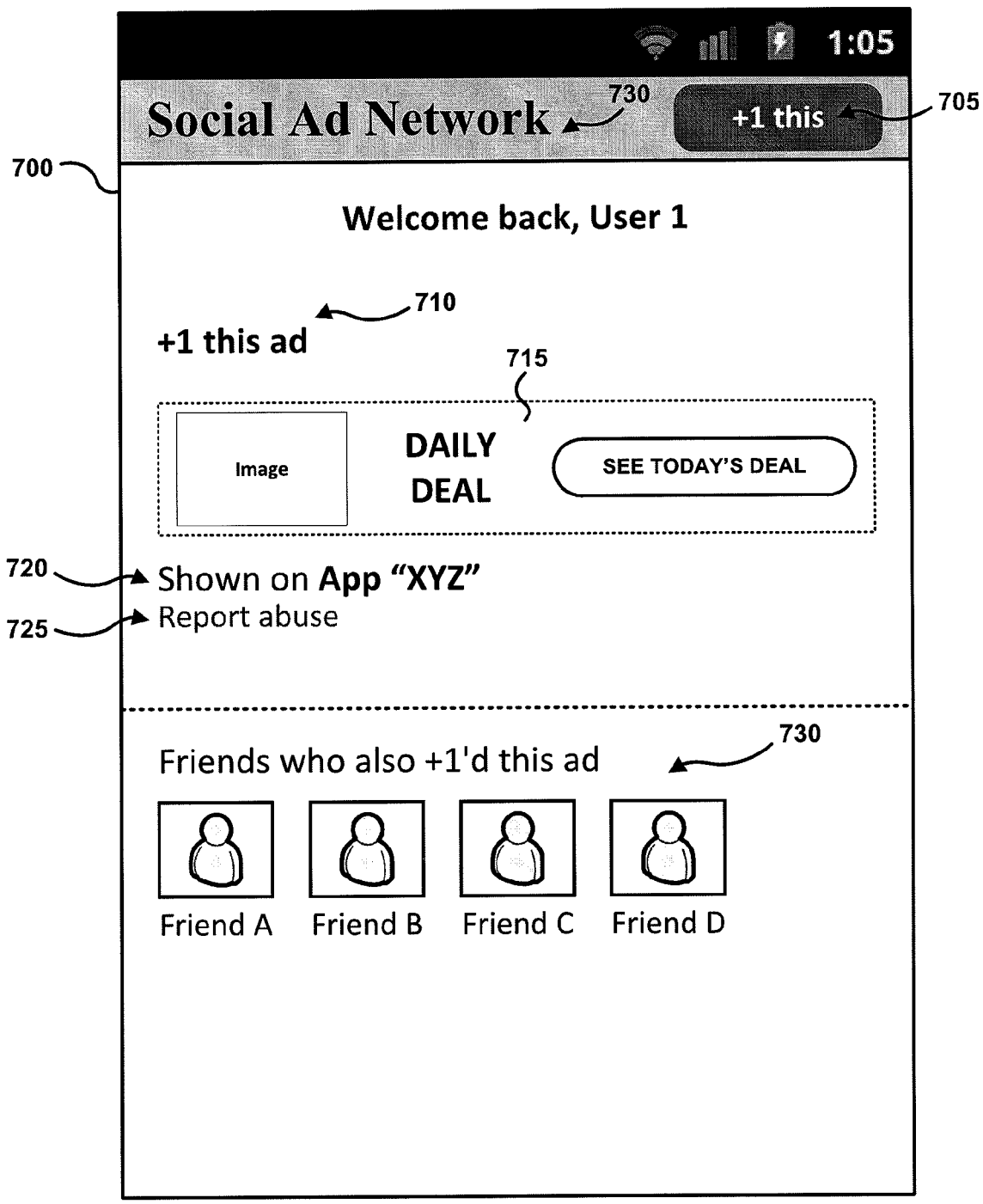
FIG. 7 is an example user interface that includes a request for a user to confirm a recommendation of a display advertisement shown and also identifies other users who have recommended the advertisement according to one or more embodiments described herein.

The social network application server 215 passes the ad share token to a social ads service 257 along with a request for social annotations in data flow 208. Upon receiving the request, the social ads service 257 decrypts the ad share token and retrieves any relevant social annotations, indications of user recommendations, and in some embodiments, names of other users in a social network, and returns such information to the social network application server 215 in data flow 210. In some scenarios, such as when the user has not granted permission for information related to the user or the user's friends to be used or shared, the social ads service 257 returns a count of the number of users generally who have recommended a given ad, instead of returning specific information such as that mentioned above in data flow 210. An example of a user permission request user interface is shown in FIG. 7. In some embodiments, a user interface similar to that shown in FIG. 7 may be presented to a user the first time that the user interacts with the user recommendation control to indicate a recommendation of an ad displayed. In data flow 212, the social network application server 215 returns a user interface containing the user recommendation control and any relevant social annotations to the client ad manager.

Figure 3:
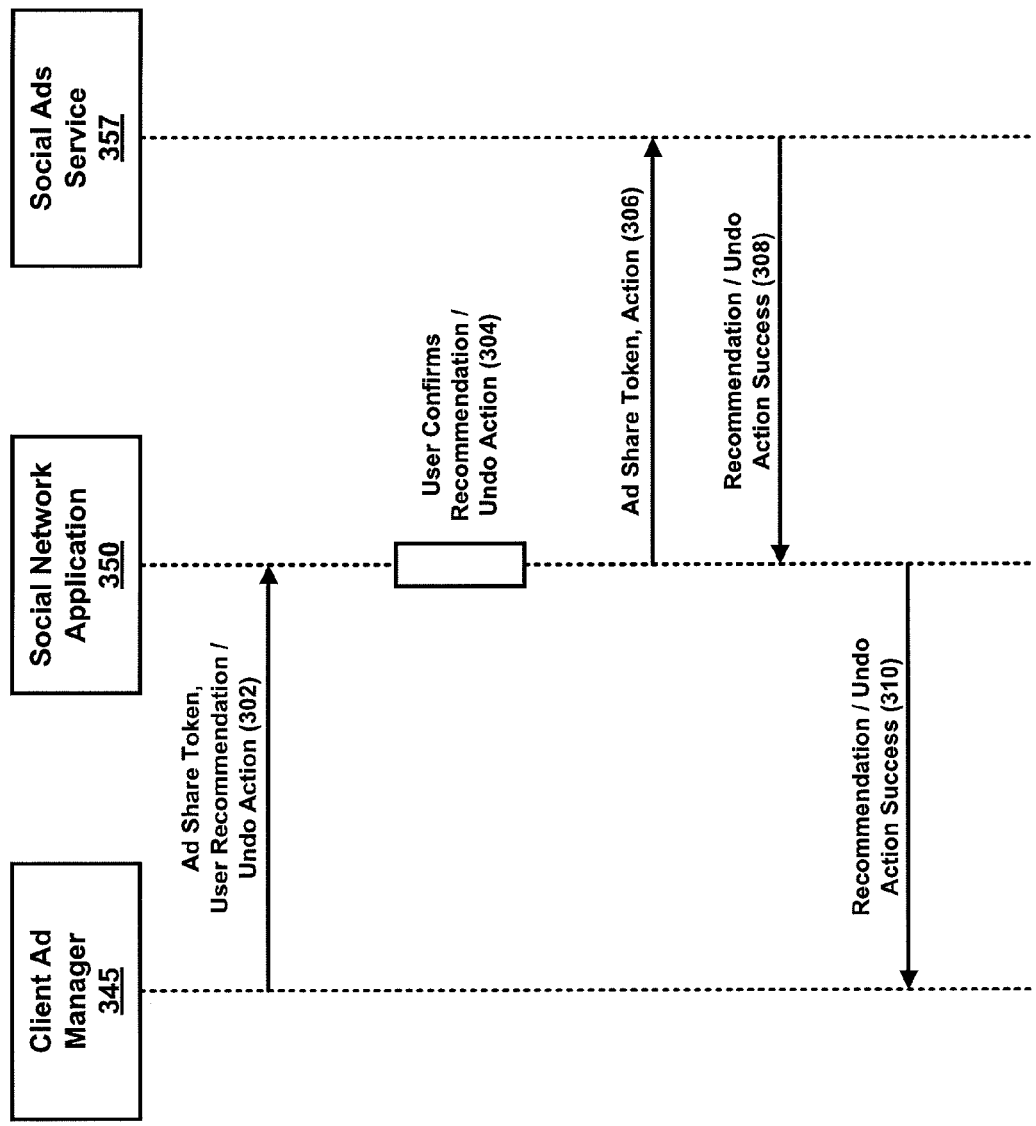
FIG. 3 is a data flow diagram illustrating example communications for confirming a recommendation of an advertisement made by a user in a third-party application according to one or more embodiments described herein.
Figure 8:
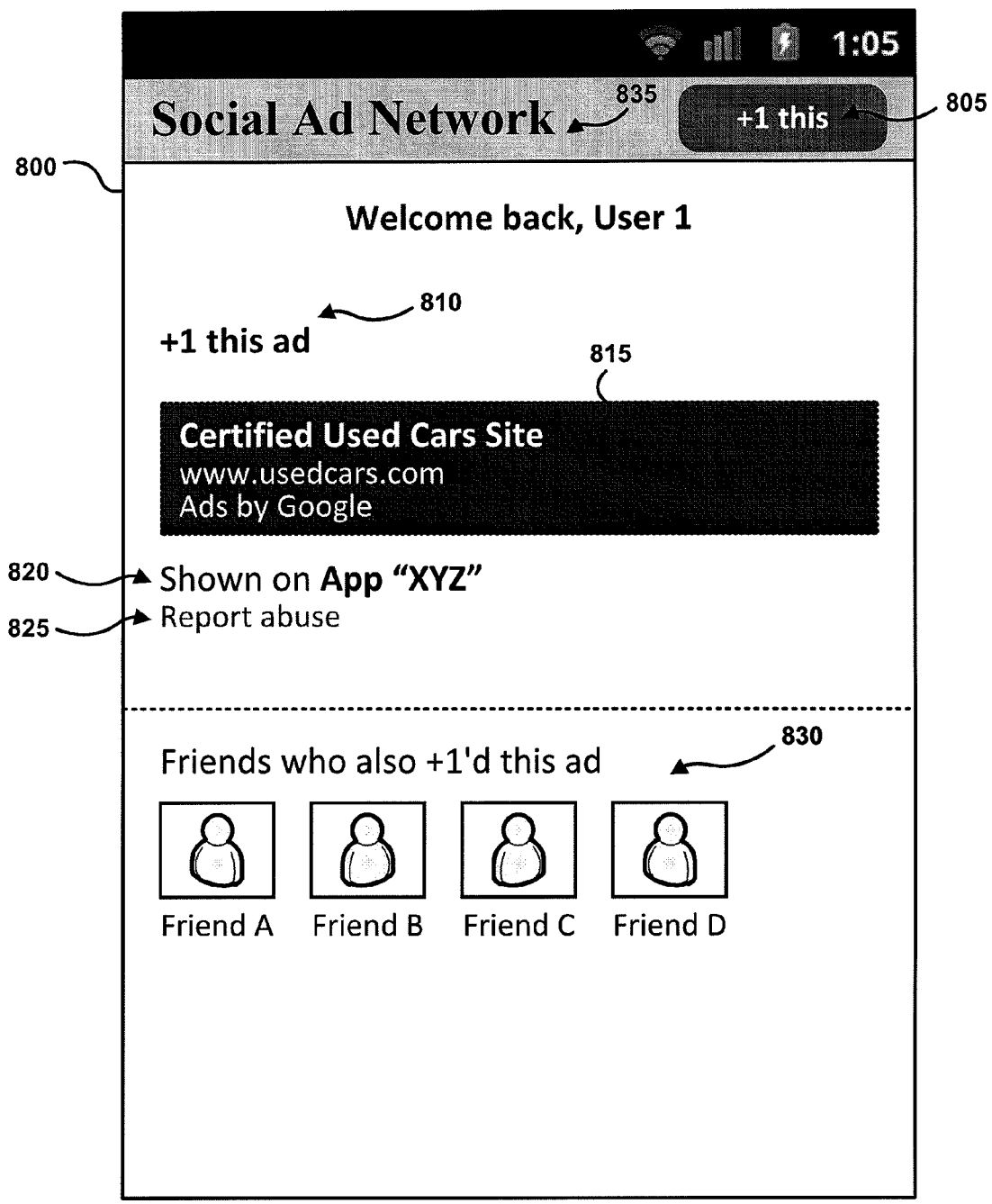
FIG. 8 is an example user interface that includes a request for a user to confirm a recommendation of a text advertisement shown and also identifies other users who have recommended the advertisement according to one or more embodiments described herein

FIG. 3 is a data flow diagram illustrating example communications for confirming an ad recommendation made by a user so as to prevent such a recommendation from being made by a third-party application in which the ad is displayed according to one or more embodiments described herein. In response to receiving an indication of a user recommendation action (e.g., by a user interacting with the user recommendation control presented with an ad), indicating that a user wishes to recommend an ad or undo a recommendation made for an ad, a client ad manager 345 sends an ad share token and the indicated action 302 (e.g., user recommendation or undo recommendation) to a social network application 350. The client ad manager 345 may send the indicated action 302 in the form of an intent, such that the social network application 350 may present the user with a confirmation request screen, such as that shown in either one of the example user interfaces of FIGS. 7 and 8. If the user confirms the recommendation or undo recommendation action 304, then the social network application 350 sends the ad share token and the confirmed user action 306 to a social ads service 357 to be decrypted. Once the social ads service 357 decrypts the ad share token, it sends a recommendation or undo recommendation action success indication 308 back to the social network application 350, which then passes along the recommendation or undo recommendation action success 310 to the client ad manager 345, again in the form of an intent. In at least some embodiments, the client ad manager 345, upon receiving the recommendation or undo recommendation action success 310, will cause a user interface being displayed to the user in a third-party application (e.g., application 120 shown in FIG. 1) to change the appearance of a user recommendation control (e.g., user recommendation control 130 shown in FIG. 1) being presented in the user interface.

Example user interfaces for displaying a user recommendation control and social network annotations in conjunction with advertisements are described below with reference to FIGS. 5-8. An example process by which such user interfaces are generated is described below with reference to FIG. 4. Additionally, in accordance with one or more embodiments described herein, the example user interfaces shown in FIGS. 5-8 may be used to confirm a recommendation of an advertisement made by a user. This confirmation process will be described in greater detail below.

Figure 4:
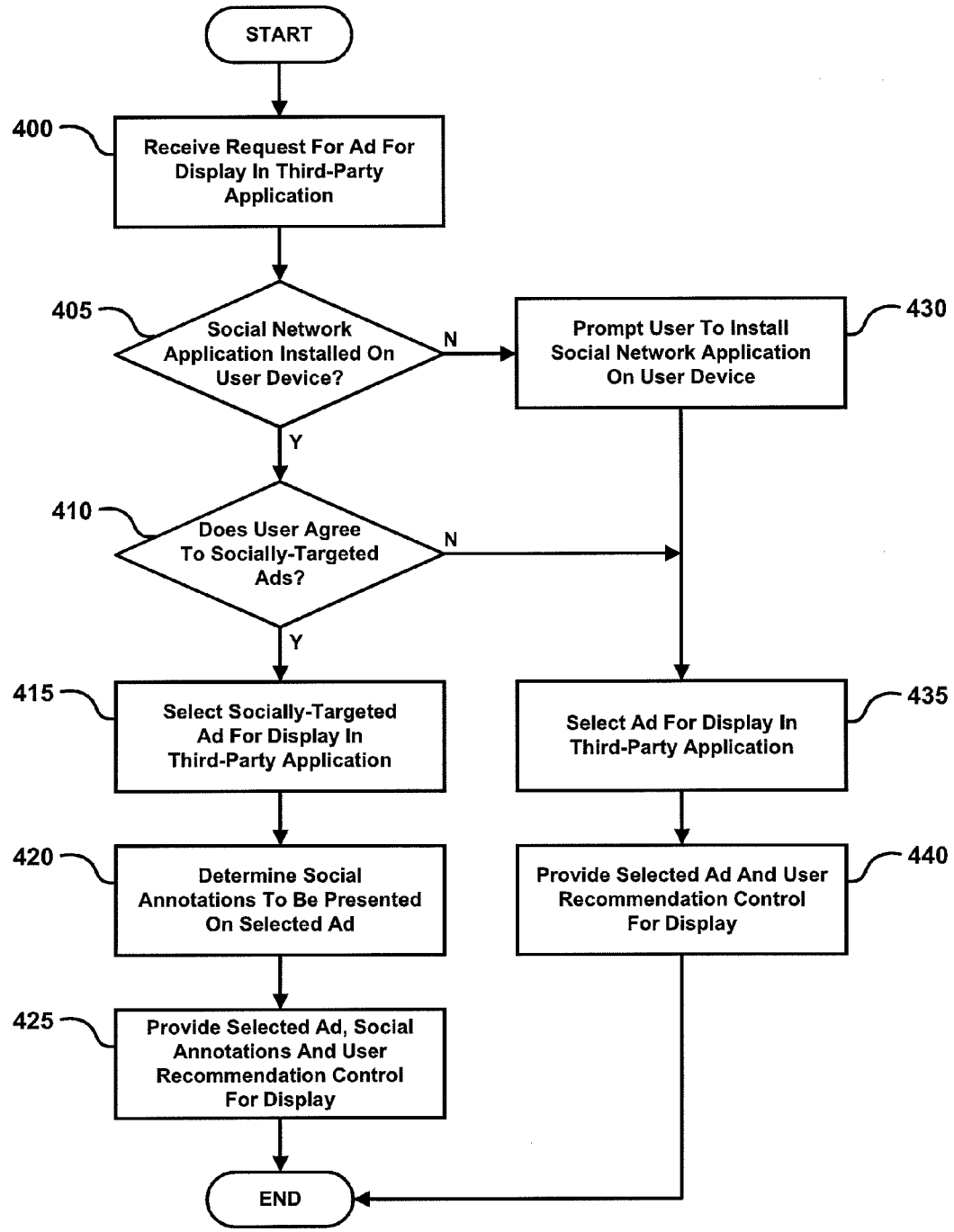
FIG. 4 is a flowchart illustrating an example process for providing a user recommendation control and personalized social annotations in conjunction with an advertisement in a third-party application according to one or more embodiments described herein.

FIG. 4 illustrates an example process for generating user interfaces that include a user recommendation control and social network annotations in conjunction with advertisements. The process begins in step 400 where a server (e.g., ad management server 110 shown in FIG. 1) receives a request for an ad to be displayed in a third-party application on a user device (e.g., user device 105 shown in FIG. 1). In one or more embodiments, the ad request received by the server may be a request for an ad to be displayed in a particular advertising slot associated with a third-party application, such as a slot for a banner ad to be displayed along the bottom portion of an opening user interface screen of a gaming application installed on the user device.

In step 405 it is determined whether a social network application (e.g., social network application 150 shown in FIG. 1) is installed on the user device. The determination as to whether the social network application is installed on the user device may be made through any of a variety of different methods for identifying applications installed on a user device. For example, the user device may be polled for all applications installed thereon, or a query may be sent to the user device to determine if the social network application is present.

If it is found in step 405 that the social network application is not installed on the user device, then the process may proceed to step 430 where a prompt is generated prompting a user of the user device to install (e.g., download) the social network application. In at least some embodiments of the disclosure, after prompting a user to install the social network application in step 430, the process may automatically return to step 405 where the determination is again made as to whether the social network application is present on the user device. In other embodiments, following the prompt being generated and presented for display on the user device in step 430, the process may instead continue to step 435 where an ad is selected for display in the third-party application. For example, in either of steps 415 and 435, an ad may be selected for display in the third-party application by an ad selector configured to select an ad from an ads database (e.g., ad selector 175 selecting an ad from ads database 195 shown in FIG. 1) using a type of advertiser auctioning process.

If it is determined in step 405 that the social network application is installed on the user device, then the process goes to step 410 where a determination is made as to whether a user (e.g., a particular user-account associated with the user device or a user associated with an account currently logged-in through the user device) of the user device has agreed to receive socially-targeted ads for display in the third-party application. Stated differently, in step 410 it is determined whether the user has "opted-out" of receiving socially-targeted ads. For example, a user who does not wish for any information related to the user (e.g., user activity, age, geographic location, interests, etc.) or those in relation to the user (e.g., other users in a social network associated with the social network application who are the user's friends or somehow share some connection with the user) to be used in the selection of ads presented for display in certain third-party applications may elect not to receive socially-targeted ads.

Where it is determined in step 410 that the user has elected not to receive socially-targeted ads in the third-party application (e.g., the user has "opted-out" of social ads), the process moves to step 435 where an ad is selected for display by any of a variety of known ad selection methods. If it is instead determined in step 410 that the user has not opted-out of receiving social ads, then in step 415 a socially-targeted ad is selected for display in the third-party application.

In at least some embodiments, a socially-targeted ad may be an ad that presents one or more pieces of information relevant to the particular user. For example, a socially-targeted ad may be based on ad usage information collected for the user, which may include measured or observed behavior of the user with regard to previous ads that have been presented for display. Additional examples of ad usage information that may form the basis for socially-targeted ads include information about whether or not the user, and/or any other users in the social network of the user (e.g., the user's friends in the social network), has indicated he or she likes an ad, has posted a comment about an ad, has sent a message (e.g., a text message, e-mail message, etc.) about an ad, has visited a web page associated with an ad, and various other information related to user-behavior with regard to particular ads.

In step 420 a determination is made as to what social annotations are to be presented in conjunction with the ad selected in step 415. With reference to the example user interfaces 700 and 800 shown in FIGS. 7 and 8, respectfully, ads may be provided for display along with social annotations, which may include content related to the user's social network. For example, user interface 700, which shows a recommendation confirmation request, includes social annotations 730. In at least one embodiment described herein, the social annotations 730 may include information about one or more friends (e.g., "Friend A", "Friend B", etc.) of the user (e.g., "User 1") that have recommended a particular ad 715 that has been presented to the user in a third-party application 720 (e.g., App "XYZ"). The user interface 800 shown in FIG. 8 includes similar social annotations 830, where these social annotations are displayed with text ad 815.

Once the social annotations are determined in step 420, the process continues to step 425 where the selected ad, the social annotations and a user recommendation control are provided for presentation together in the third-party application on the user device. In a scenario where it is determined in step 405 that the social network application is not installed on the user device, or where it is determined in step 410 that the user has opted-out of socially-targeted ads, then following the ad selection in step 435 the ad is provided for presentation along with a user recommendation control in step 440, but not with a social annotations.

Figure 9:
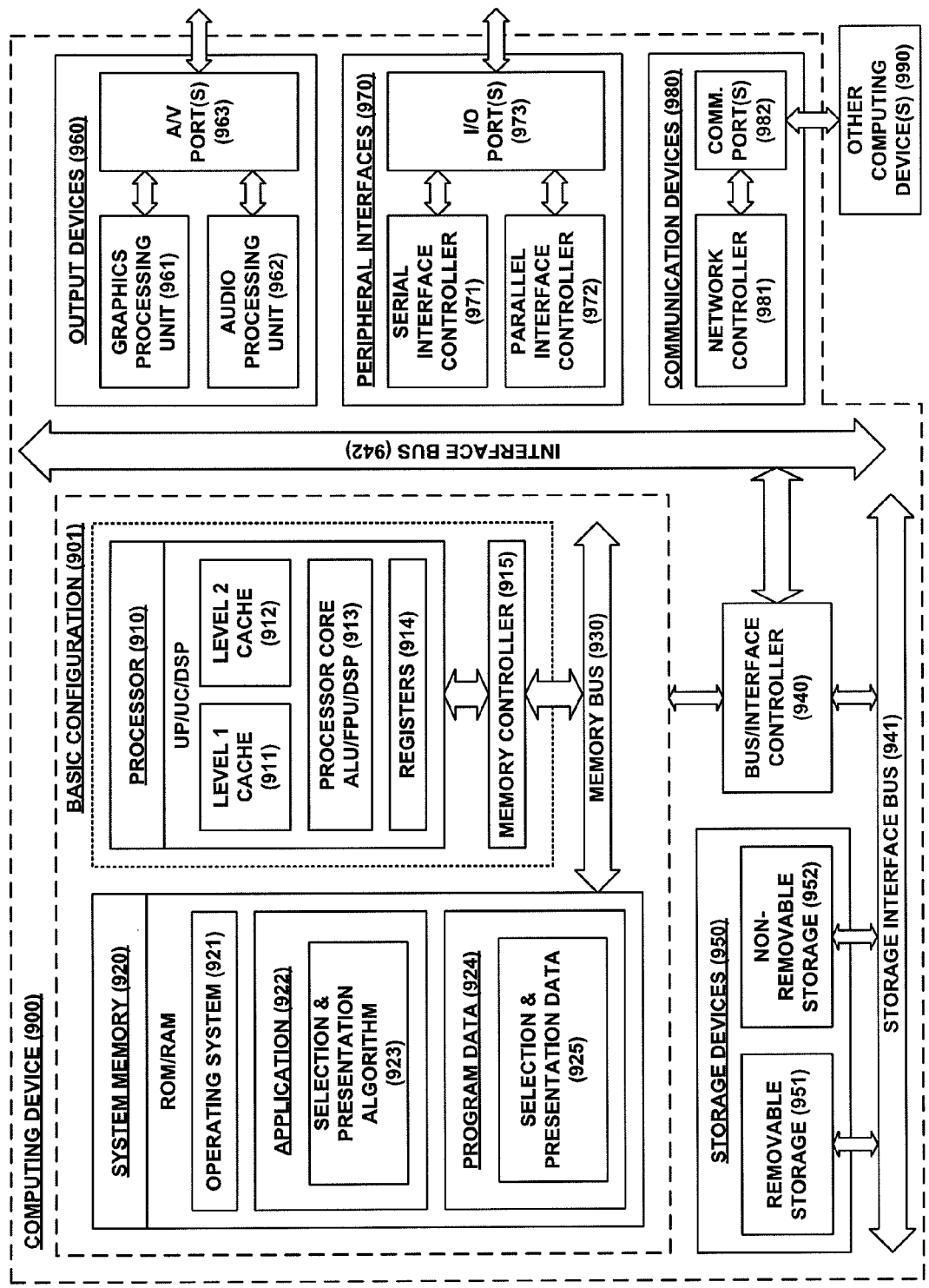
FIG. 9 is a block diagram illustrating an example computing device arranged for selecting and presenting content according to one or more embodiments described herein.

FIG. 9 is a block diagram illustrating an example computing device 900 that is arranged for selecting and presenting an item of promotional content (e.g., an advertisement) to a user or user device in accordance with one or more embodiments of the present disclosure. In a very basic configuration 901, computing device 900 typically includes one or more processors 910 and system memory 920. A memory bus 930 may be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 can also be used with the processor 910, or in some embodiments the memory controller 915 can be an internal part of the processor 910.

Depending on the desired configuration, the system memory 920 can be of any type including but not limited to volatile memory (e.g., RAM), non-volatile memory (e.g., ROM, flash memory, etc.) or any combination thereof. System memory 920 typically includes an operating system 921, one or more applications 922, and program data 924. In at least some embodiments, application 922 includes a selection and presentation algorithm 923 that is configured to select an advertisement, and provide that advertisement to a user device for presentation to a user. The selection and presentation algorithm is further arranged to identify annotations (e.g., content associated with a social network of a user) for presentation to a user along with the selected advertisement.

Program Data 924 may include selection and presentation data 925. In some embodiments, application 922 can be arranged to operate with program data 924 on an operating system 921 such that a request made by a user of a user device (e.g., user device 105 shown in FIG. 1) is routed via a social network application (e.g., social network application 150 shown in FIG. 1), which acts as a proxy for transmitting such requests to an appropriate server.

Computing device 900 can have additional features and/or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of computing device 900.

Computing device 900 can also include an interface bus 942 for facilitating communication from various interface devices (e.g., output interfaces, peripheral interfaces, communication interfaces, etc.) to the basic configuration 901 via the bus/interface controller 940. Example output devices 960 include a graphics processing unit 961 and an audio processing unit 962, either or both of which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication (not shown) via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   receiving, at a server, a request for promotional content to be displayed in a third-party application on a user device;
   responsive to receiving the request, determining that a social network application is installed on the user device, the social network application being separate from the third-party application and containing information about a social network of a user of the device;
   determining, by the server, that the user accepts annotations being presented in conjunction with promotional content when the promotional content is displayed on the user device, the annotations including information about one or more individuals associated with the user in the social network;
   selecting a promotional content item to be displayed in the third-party application;
   determining, based on the selected promotional content item and the information about the one or more individuals associated with the user in the social network, an annotation to be presented in conjunction with the promotional content item;
   providing, for display in the third-party application, the selected promotional content item, the annotation, and a user recommendation control associated with the social network;
   responsive to receiving an indication that the user recommended the promotional content item displayed in the third-party application, the social network application presenting the user with a request for the user to confirm that the user intended to recommend the promotional content item, the request being presented to the user in the social network application;
   receiving, in the social network application, the requested confirmation that the user intended to recommend the promotional content item; and
   responsive to receiving the requested confirmation, generating, for display in the social network application, an annotation indicating that the user recommended the promotional content item.

2. The method of claim 1, wherein the indication that the user recommended the promotional content item is based on a detected interaction with the user recommendation control displayed with the promotional content item in the third-party application.

3. The method of claim 1, further comprising:
   presenting the annotation indicating that the user recommended the promotional content item to one or more of the individuals associated with the user in the social network.

4. The method of claim 1, further comprising:
   determining whether the received indication is for a first recommendation of promotional content made by the user; and responsive to determining that the received indication is for a first recommendation of promotional content made by the user, presenting the user with a request for permission to collect information about the user, the request for permission being presented to the user in the social network application.

5. The method of claim 4, further comprising:
responsive to receiving the requested permission from the user, the social network application presenting the user with a request for the user to confirm that the user intended to recommend the promotional content item, the request being presented to the user in the social network application.

6. The method of claim 1, wherein presenting the user with the request for the user to confirm that the user intended to recommend the promotional content item includes displaying, in the social network application, the selected promotional content item, an identifier of the third-party application, and at least one user-selectable action.

7. The method of claim 6, wherein the at least one user-selectable action includes at least one of confirming the recommendation of the promotional content item and canceling the recommendation of the promotional content item.

8. The method of claim 1, wherein the information about the one or more individuals associated with the user in the social network included in annotations presented in conjunction with promotional content includes one or both of a quantity of other users in the social network who recommend the promotional content and identifiers of other users in the social network who recommend the promotional content.

9. The method of claim 1, further comprising, in response to receiving the requested confirmation that the user intended to recommend the promotional content item, altering the display of the user recommendation control in the third-party application.

10. The method of claim 1, wherein the annotation provided for display with the promotional content item in the third-party application includes an identifier of at least one other user in the social network who recommends the promotional content item.

11. A system comprising:
at least one processor; and
a computer-readable medium coupled to the at least one processor having instructions stored thereon which, when executed by the at least one processor, causes the at least one processor to:
receive a request for promotional content to be displayed in a third-party application on a user device;
responsive to receiving the request, determine that a social network application is installed on the user device, the social network application being separate from the third-party application and containing information about a social network of a user of the device;
use the social network application to determine that the user accepts annotations being presented in conjunction with promotional content when the promotional content is displayed on the user device, the annotations including information about one or more individuals associated with the user in the social network;
select a promotional content item to be displayed in the third-party application;
determine, based on the selected promotional content item and the information about the one or more individuals associated with the user in the social network, an annotation to be presented in conjunction with the promotional content item;
provide, for display in the third-party application, the selected promotional content item, the annotation, and a user recommendation control associated with the social network;
responsive to receiving an indication that the user recommended the promotional content item displayed in the third-party application, present the user with a request for the user to confirm that the user intended to recommend the promotional content item, the request being presented to the user in the social network application;
receive, in the social network application, the requested confirmation that the user intended to recommend the promotional content item; and
responsive to receiving the requested confirmation, generate, for display in the social network application, an annotation indicating that the user recommended the promotional content item.

12. The system of claim 11, wherein the indication that the user recommended the promotional content item is based on a detected interaction with the user recommendation control displayed with the promotional content item in the third-party application.

13. The system of claim 11, wherein the at least one processor is further caused to:
present the annotation indicating that the user recommended the promotional content item to one or more of the individuals associated with the user in the social network.

14. The system of claim 11, wherein the at least one processor is further caused to:
determine whether the received indication is for a first recommendation of promotional content made by the user; and
responsive to determining that the received indication is for a first recommendation of promotional content made by the user, present the user with a request for permission to collect information about the user, the request for permission being presented to the user in the social network application.

15. The system of claim 14, wherein the at least one processor is further caused to:
responsive to receiving the requested permission from the user, present the user with a request for the user to confirm that the user intended to recommend the promotional content item, the request being presented to the user in the social network application.

16. The system of claim 11, wherein presenting the user with the request for the user to confirm that the user intended to recommend the promotional content item includes displaying, in the social network application, the selected promotional content item, an identifier of the third-party application, and at least one user-selectable action.

17. The system of claim 16, wherein the at least one user-selectable action includes at least one of confirming the recommendation of the promotional content item and canceling the recommendation of the promotional content item.

18. The system of claim 11, wherein the information about the one or more individuals associated with the user in the social network included in annotations presented in conjunction with promotional content includes one or both of a quantity of other users in the social network who recommend the promotional content and identifiers of other users in the social network who recommend the promotional content.

19. The system of claim 11, wherein the at least one processor is further caused to, in response to receiving the requested confirmation that the user intended to recommend the promotional content item, alter the display of the user recommendation control in the third-party application.

20. The system of claim 11, wherein the annotation provided for display with the promotional content item in the third-party application includes an identifier of at least one other user in the social network who recommends the promotional content item.

* * * * *